United States Patent
Amano

(10) Patent No.: US 10,181,096 B2
(45) Date of Patent: Jan. 15, 2019

(54) COMMUNICATION APPARATUS, METHOD FOR CONTROLLING COMMUNICATION APPARATUS, AND STORAGE MEDIUM

(71) Applicant: CANON KABUSHIKI KAISHA, Tokyo (JP)

(72) Inventor: Ryosuke Amano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/988,519

(22) Filed: Jan. 5, 2016

(65) Prior Publication Data

US 2016/0203393 A1     Jul. 14, 2016

(30) Foreign Application Priority Data

Jan. 8, 2015  (JP) .................. 2015-002521

(51) Int. Cl.
 *G06K 15/00*  (2006.01)
 *H04W 36/00*  (2009.01)
  (Continued)

(52) U.S. Cl.
CPC ......... *G06K 15/4045* (2013.01); *G06F 3/121* (2013.01); *G06F 3/1236* (2013.01); *G06F 3/1292* (2013.01); *H04W 4/80* (2018.02); *H04W 36/0011* (2013.01); *H04W 36/165* (2013.01); *H04W 84/18* (2013.01)

(58) Field of Classification Search
CPC .... G06F 3/1203; G06F 3/1211; G06F 3/1236; G06F 3/1292; G06F 3/128; G06F 3/1204; G06F 3/1285–3/1289; G06F 3/129; G06F 17/30887; H04W 40/24; H04W 36/0022; H04W 4/008; H04W 72/1215; H04W 76/023; H04W 84/12; H04W 88/06;
(Continued)

(56) References Cited

U.S. PATENT DOCUMENTS

2004/0224642 A1*  11/2004  Kim .................... H04L 12/5695
                                                          455/74.1
2014/0213190 A1*   7/2014  Yamaoka .............. G06F 3/1204
                                                          455/41.3
(Continued)

FOREIGN PATENT DOCUMENTS

JP       2006-133877 A      5/2006
JP       2013025810 A       2/2013
(Continued)

*Primary Examiner* — Chad Dickerson
(74) *Attorney, Agent, or Firm* — Canon U.S.A., Inc. IP Division

(57) ABSTRACT

A communication apparatus transmits service information indicating a first service to be executed via an external apparatus and containing address information for communicating with the external apparatus, with the service information contained in information for handing over connection to a communication method different from a first communication method, to another communication apparatus by the first communication method, and executes the first service based on communication performed by a second communication method different from the first communication method and executes communication between the communication apparatus and the external apparatus.

16 Claims, 15 Drawing Sheets

(51) Int. Cl.
*H04W 4/80* (2018.01)
*G06F 3/12* (2006.01)
*H04W 36/16* (2009.01)
*H04W 84/18* (2009.01)

(58) Field of Classification Search
CPC ........... H04W 36/011; H04W 36/0011; H04W 84/18; H04N 1/00222; G06K 15/4045
USPC ..... 358/1.11–1.18, 400–404; 455/41.1, 41.2, 455/41.3; 709/201–203, 212–219
See application file for complete search history.

(56) References Cited

U.S. PATENT DOCUMENTS

| | | | | |
|---|---|---|---|---|
| 2014/0240774 | A1* | 8/2014 | Suzuki | G06F 3/1236 358/1.15 |
| 2014/0293980 | A1* | 10/2014 | Shibata | H04W 88/06 370/338 |
| 2015/0002892 | A1* | 1/2015 | Maeda | H04N 1/32539 358/1.15 |

FOREIGN PATENT DOCUMENTS

| | | |
|---|---|---|
| JP | 2014-149666 A | 8/2014 |
| JP | 2014-157532 A | 8/2014 |
| JP | 2014168213 A | 9/2014 |
| JP | 2014179799 A | 9/2014 |
| JP | 2014-195980 A | 10/2014 |
| JP | 2015-108951 A | 6/2015 |

\* cited by examiner

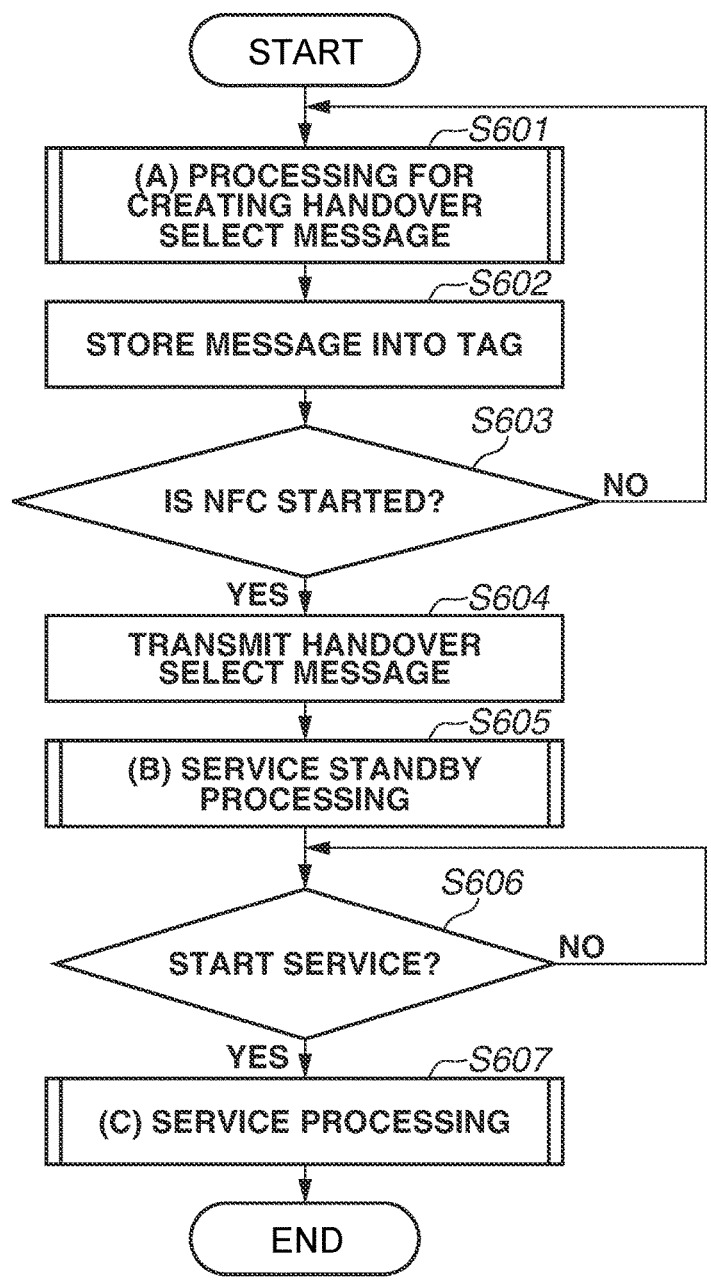

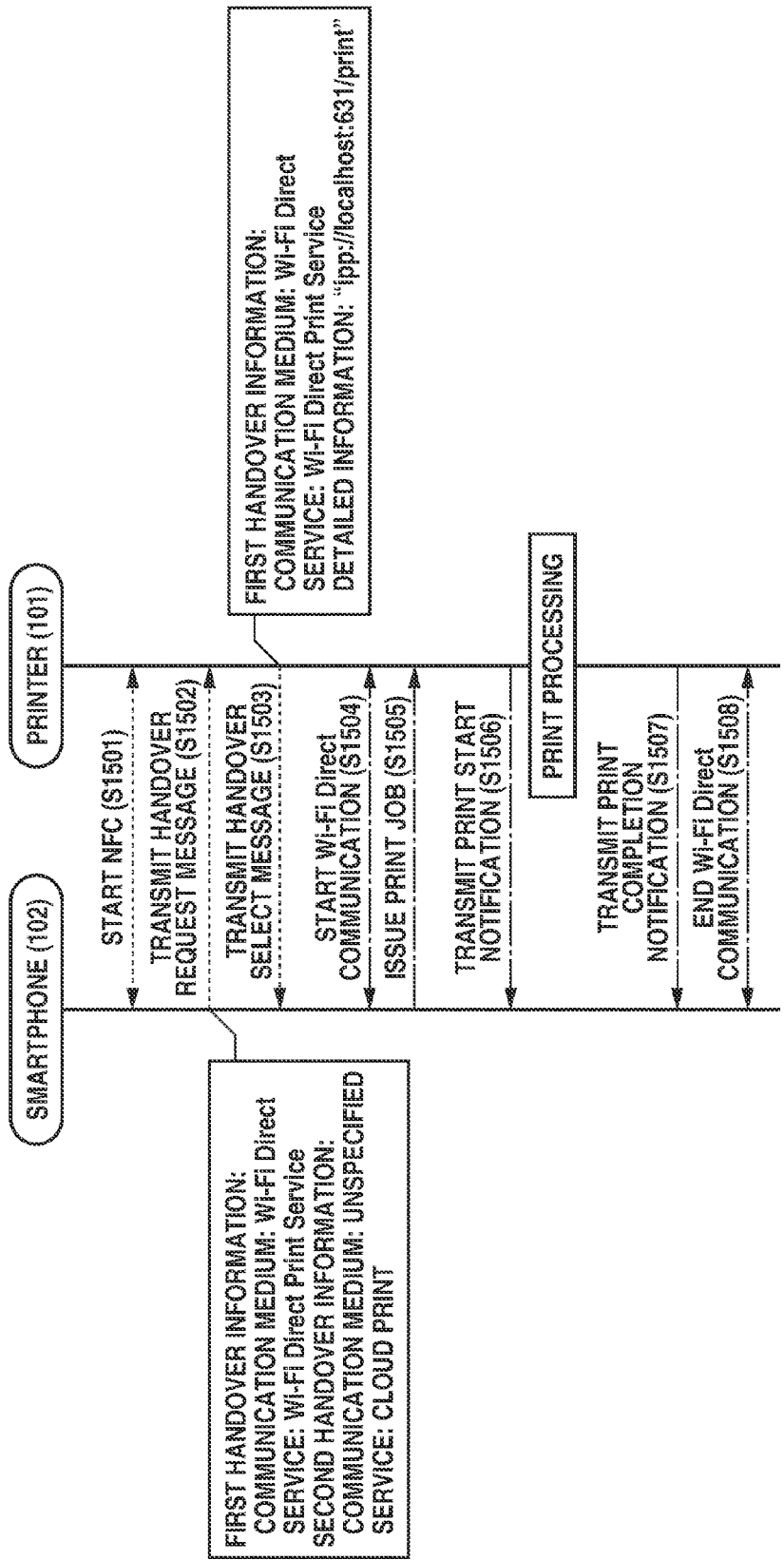

COMMUNICATION APPARATUS, METHOD FOR CONTROLLING COMMUNICATION APPARATUS, AND STORAGE MEDIUM

BACKGROUND

Field

Aspects of the present invention generally relate to a communication technique.

Description of the Related Art

Conventionally, there have been known mobile terminals that can use near field wireless communication such as Near Field Communication (NFC), Infrared Data Association (IrDA), and TransferJet®. The near field wireless communication allows users to perform data transmission and reception between apparatuses only by performing an operation of bringing the apparatuses close to each other. Further, there is a technique for conducting a handover from such near field wireless communication to a different wireless communication method such as a wireless local area network (LAN) (the Institute of Electrical and Electronics Engineers (IEEE) 802.11 series) and Bluetooth®. The handover refers to an operation of switching connection from communication via a first communication path based on a first communication method to communication via a second communication path based on a second communication method.

Further, there is a technique called a direct print service, by which a mobile terminal directly transmits document/image data to a printer via the wireless communication after the handover, thereby causing the printer to print the transmitted data (Japanese Patent Application Laid-Open No. 2014-195980).

On the other hand, there is a cloud computing service called a Software as a Service (SaaS) that discloses software on the Internet. The cloud refers to an area where a server group is set up on a network. Under a cloud computing environment, the users can use computer processing performed by the server group as a service via the network. One example of this SaaS is a service called a cloud print service, by which a mobile terminal such as a smartphone serving as a client apparatus transmits, via the cloud, document/image data to a printer connected to the network, thereby causing the printer to print the transmitted data (Japanese Patent Application Laid-Open No. 2006-133877).

Conventionally, the execution of the direct print service has been able to be triggered by the establishment of the near field wireless communication between the mobile terminal and the printer, as in Japanese Patent Application Laid-Open No. 2014-195980 described above. However, no consideration has been given to allowing the execution of the cloud print service to be triggered by the establishment of the near field wireless communication.

SUMMARY

According to an aspect of the present invention, a communication apparatus includes a first communication unit configured to perform near field wireless communication by a first communication method, a transmission unit configured to transmit service information regarding a service executable by the communication apparatus to another communication apparatus by the first communication unit with the service information contained in information for handing over connection to a communication method different from the first communication method, and a first execution unit configured to, in a case where the service information transmitted by the transmission unit is service information indicating a first service to be executed via an external apparatus different from the another communication apparatus and containing address information for communicating with the external apparatus, execute the first service based on communication established between the another communication apparatus and the external apparatus according to the address information contained in the service information and is performed by a second communication method different from the first communication method and execute communication between the communication apparatus and the external apparatus.

Further features of the present disclosure will become apparent from the following description of exemplary embodiments with reference to the attached drawings.

BRIEF DESCRIPTION OF THE DRAWINGS

FIG. 6 is a flowchart illustrating an operation of the printer.

FIG. 15 illustrates a communication sequence of the system.

DESCRIPTION OF THE EMBODIMENTS

Exemplary embodiments that will be described below are directed to allowing execution of a service based on communication with an external apparatus triggered by establishment of near field wireless communication with another communication apparatus.

Figure 1:
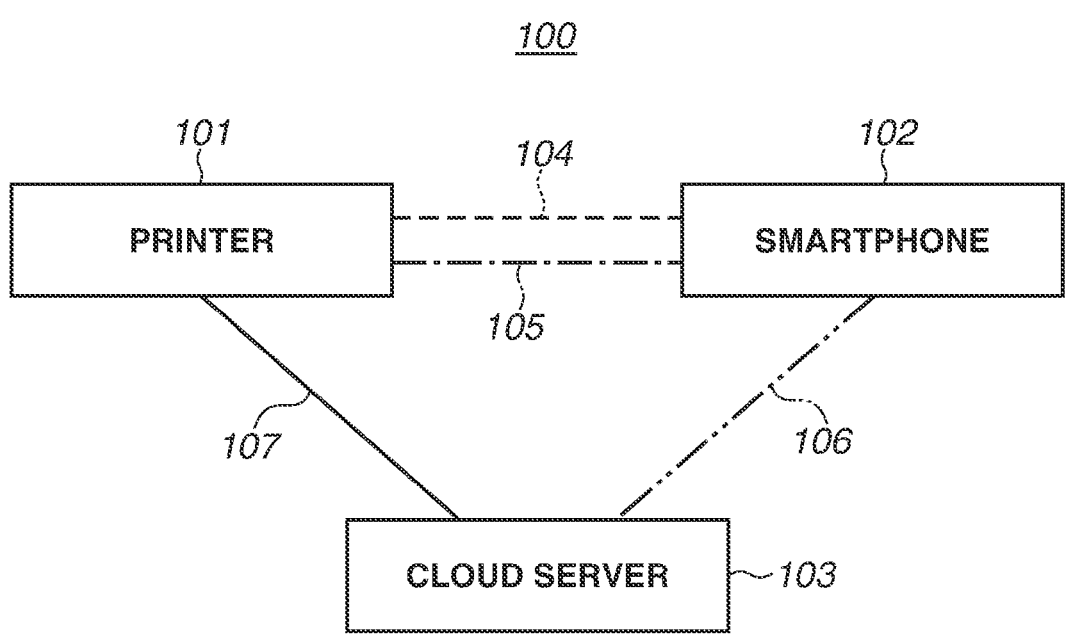
FIG. 1 illustrates an example of a configuration of a system.

Communication apparatuses and a communication system according to the present exemplary embodiment will be described in detail with reference to the drawings. FIG. 1 illustrates an apparatus configuration of a communication system 100, which is assumed to be employed in the present exemplary embodiment. In FIG. 1, the communication system 100 includes a printer 101, a smartphone 102, and a cloud server 103. The cloud server 103 is an information processing apparatus connected to an external network such as the Internet, and provides the cloud computing service. The cloud server 103 can provide, as a service, computer processing performed within the cloud server 103 to a client via the network. The Internet is a computer network that connects a plurality of networks to one another using a communication protocol, Transmission Control Protocol/Internet Protocol (TCP/IP). Further, an apparatus connected to the Internet is uniquely identified based on a global IP address. The cloud server 103 provides the cloud print service of holding document/image data received via the external network, and transferring the held document/image data to a printer connected to the external network to thereby cause the printer to print the transferred data. The smartphone 102 or the printer 101 in the communication system 100 according to the present exemplary embodiment may be, for example, an apparatus such as a digital camera, a personal computer (PC), a video camera, a smart watch, and a personal digital assistant (PDA). Further, the cloud server 103 may include a plurality of apparatuses.

The printer 101 and the smartphone 102 can communicate with each other using NFC 104, which is near field wireless communication. Further, the printer 101 and the smartphone 102 can communicate with each other using wireless LAN communication 105. A communication distance and a communication speed of the NFC 104 are shorter and slower than those of the wireless LAN communication 105. The NFC 104 is communication according to a method defined by the NFC Forum. Further, the smartphone 102 can communicate with the cloud server 103 via public wireless communication 106. The public wireless communication 106 enables communication on the external network such as the Internet. On the other hand, the printer 101 can communicate with the cloud server 103 via wired communication 107. The wired communication 107 enables communication on the external network such as the Internet. In the present exemplary embodiment, the smartphone 102 and the printer 101 communicate with the cloud server 103 via the public wireless communication 106 and the wired communication 107, respectively, but may communicate with the cloud server 103 using a communication method other than the foregoing.

Figure 2:
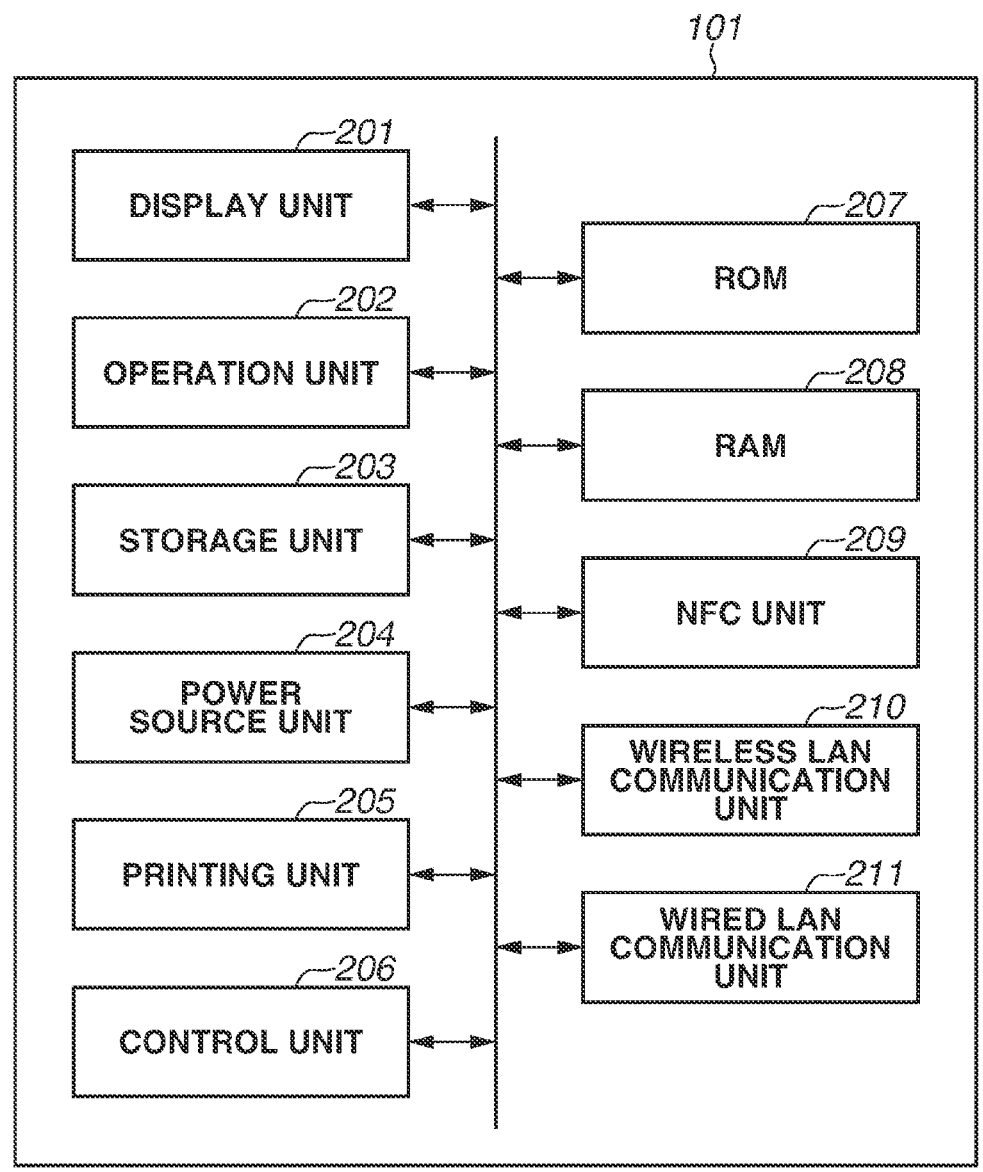
FIG. 2 illustrates an example of a hardware configuration of a printer.

Subsequently, FIG. 2 illustrates a hardware configuration of the printer 101. The printer 101 includes a display unit 201, an operation unit 202, a storage unit 203, a power source unit 204, a printing unit 205, a control unit 206, a read-only memory (ROM) 207, a random access memory (RAM) 208, an NFC unit 209, a wireless LAN communication unit 210, and a wired LAN communication unit 211.

The display unit 201 includes, for example, a liquid crystal display (LCD) and/or a light-emitting diode (LED). The display unit 201 has a function of outputting information visually recognizable by a user, and displays various kinds of user interfaces (UIs). The operation unit 202 has a function for allowing the user to operate the printer 101 by, for example, entering various kinds of inputs. The storage unit 203 includes a storage medium such as a hard disk drive (HDD), a flash memory, or a detachable SD card, and stores and manages various kinds of data, such as information about a wireless communication network, information about data transmission and reception, and image data. The power source unit 204 is, for example, an alternating current (AC) adapter. The power source unit 204 acquires a power source for operating the entire apparatus from an outlet or the like, and supplies power to each of the hardware devices. The printing unit 205 includes an ink tank, a head, a sheet feed and conveyance unit, and the like, and is a hardware element for printing image/text data and the like.

The control unit 206 is, for example, a central processing unit (CPU), and controls an operation of each of the component elements of the printer 101. The ROM 207 stores a control command, i.e., a program. Various kinds of operations to be described below are realized by the control unit 206 executing a control program stored in the ROM 207. The RAM 208 is used as a work memory when the program is executed, an area for temporarily saving data, and the like.

The NFC unit 209 performs wireless communication in compliance with the NFC standard formulated by the NFC Forum. Further, the NFC unit 209 automatically establishes the NFC 104 upon detecting, within a communication range, an apparatus that can perform communication. Further, in the present exemplary embodiment, the NFC unit 209 is assumed to operate as an NFC tag. The NFC tag holds, within the hardware, a memory that is readable and writable from an external reader/writer apparatus, and performs the NFC 104 using an induced electromotive force from the reader/writer. Further, the smartphone 102 performs communication in a reader/writer mode defined by the NFC Forum, and the printer 101 performs communication in a card emulation mode defined by the NFC Forum. The reader/writer mode is a mode in which data is read from and written into the memory included in the apparatus operating in the card emulation mode. Further, the card emulation mode is a mode in which data is read from and written into the memory by the apparatus operating in the reader/writer mode. Alternatively, as the NFC 104 between the smartphone 102 and the printer 101, bidirectional communication in a peer-to-peer (P2P) mode defined by the NFC Forum may be performed.

When operating as the NFC tag, the NFC unit 209 permits both the rewriting of the information stored in the held memory internally from the control unit 206, and the rewriting of the information stored in the held memory according to writing from the reader/writer that is the external apparatus.

The NFC unit 209 is assumed herein to perform wireless communication in compliance with the NFC standard, but may be configured to perform communication according to another near field wireless communication such as infrared communication (IrDA) and TransferJet, or another wireless communication method. Alternatively, the NFC unit 209 may use the Bluetooth® Low Energy (BLE) method defined in Bluetooth® 4.0. Further, the NFC unit 209 is assumed herein to perform wireless communication in compliance with NFC, but may use any communication method that has a shorter communication distance or a slower communication speed than that of the communication method used by the wireless LAN communication unit 210.

The wireless LAN communication unit 210 performs the wireless LAN communication 105 in compliance with the IEEE (the Institute of Electrical and Electronics Engineers, Inc.) 802.11 series. The wireless LAN communication unit 210 includes a chip, an antenna, and the like for performing wireless communication in compliance with the IEEE 802.11 series. In the present exemplary embodiment, the wireless LAN communication unit 210 is assumed to perform wireless communication in compliance with the IEEE 802.11 series, but may use another communication method such as Bluetooth®. The wired LAN communication unit 211 performs wired communication in compliance with the Ethernet® standard. The wired LAN communication unit 211 can communicate with the cloud server 103 on the Internet via a LAN laid indoors. In the present exemplary embodiment, the wired LAN communication unit 211 is assumed to perform wired communication in compliance with the Ethernet® standard, but may use a communication method other than the foregoing. For example, the wired LAN communication unit 211 may connect to the Internet via the wireless LAN communication unit 210.

Figure 3:
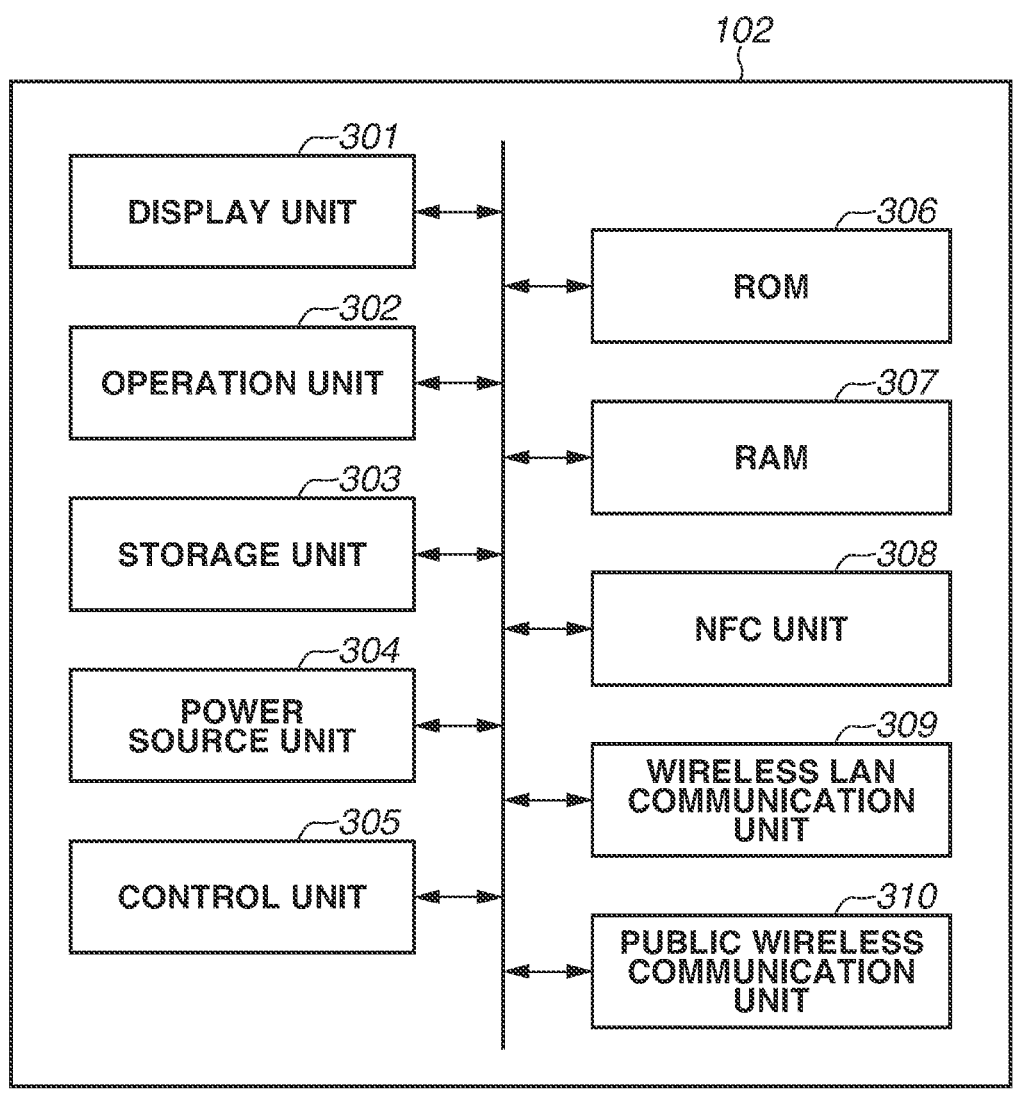
FIG. 3 illustrates an example of a hardware configuration of a smartphone.

Subsequently, FIG. 3 illustrates a hardware configuration of the smartphone 102. The smartphone 102 includes a display unit 301, an operation unit 302, a storage unit 303, a power source unit 304, a control unit 305, a ROM 306, a RAM 307, an NFC unit 308, a wireless LAN communication unit 309, and a public wireless communication unit 310.

The display unit 301 includes, for example, an LCD and/or an LED. The display unit 301 has a function of outputting information visually recognizable by the user, and displays various kinds of UIs. The operation unit 302 has the function for allowing the user to operate the smartphone 102 by, for example, entering various kinds of inputs. The display unit 301 and the operation unit 302 may be integrally formed by a touch panel or the like.

The storage unit 303 includes a storage medium such as an HDD, a flash memory, or a detachable SD card, and stores and manages various kinds of data, such as information about a wireless communication network, information about data transmission and reception, image data, and an application. The power source unit 304 is, for example, a battery. The power source unit 304 holds a power source for operating the entire apparatus, and supplies power to each of the hardware devices.

The control unit 305 is, for example, a CPU, and controls an operation of the entire smartphone 102. The ROM 306 stores a control command, i.e., a program. Various kinds of operations to be described below are realized by the control unit 305 executing a control program stored in the ROM 306. The RAM 307 is used as a work memory when the program is executed, an area for temporarily saving data, and the like.

The NFC unit 308 performs the NFC 104 in compliance with the NFC standard. Further, the NFC unit 308 automatically establishes the NFC 104 upon detecting an apparatus that can perform communication by NFC, within a communication range of the smartphone 102. In the present exemplary embodiment, the NFC unit 308 operates as the reader/writer, and can read the data stored in the internal memory of the NFC tag. The NFC unit 308 is assumed herein to perform wireless communication in compliance with the NFC standard, but may be configured to perform communication according to another near field wireless communication such as the infrared communication (IrDA) and TransferJet, or another wireless communication method. Alternatively, the NFC unit 308 may use the BLE method.

The wireless LAN communication unit 309 performs the wireless LAN communication 105. The wireless LAN communication unit 309 performs wireless communication in compliance with the IEEE 802.11 series. In the present exemplary embodiment, the wireless LAN communication unit 309 is assumed to perform wireless communication in compliance with the IEEE 802.11 series, but may use another communication method such as Bluetooth®.

The public wireless communication unit 310 performs wireless communication in compliance with a communication method such as Long Term Evolution (LTE), the standard of which is formulated by the Third Generation Partnership Project (3GPP). The public wireless communication unit 310 can communicate with the cloud server 103 on the Internet via a network of a mobile service provider. In the present exemplary embodiment, the public wireless communication unit 310 is assumed to perform wireless communication in compliance with the 3GPP standard, but may use a communication method other than the foregoing.

For example, the public wireless communication unit 310 may connect to the Internet via the wireless LAN communication unit 309.

Next, functional block diagrams of the printer 101 and the smartphone 102 will be described with reference to FIGS. 4 and 5. In the present exemplary embodiment, functional blocks of the printer 101 and the smartphone 102 are stored in the respective ROMs 207 and 306 as programs, and fulfill functions thereof by the respective control units 206 and 305 executing these programs. The control units 206 and 305 control each of the hardware devices and calculate/process information according to the control programs to thereby realize each of the functions. Some or all blocks included in the present functional blocks may be embodied as hardware. In this case, some or all blocks included in the individual functional blocks are constituted by, for example, an application specific integrated circuit (ASIC).

Figure 4:
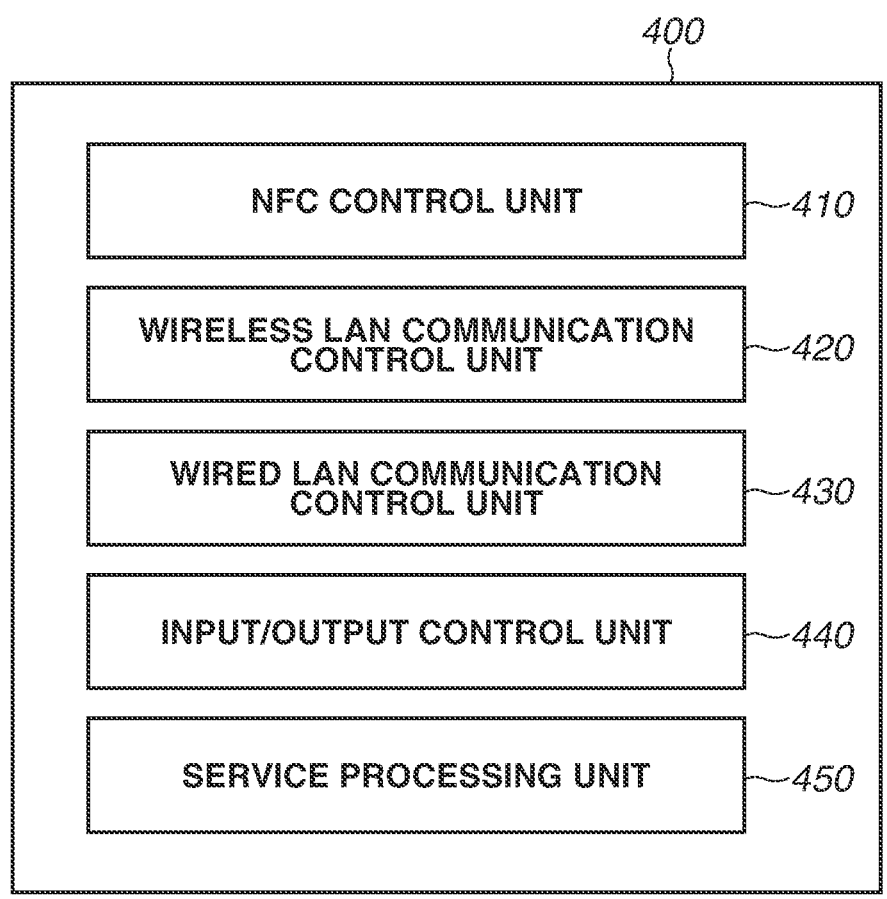
FIG. 4 illustrates an example of a configuration of functional blocks of the printer.

FIG. 4 is a functional block diagram (400) of the printer 101. The printer 101 includes an NFC control unit 410, a wireless LAN communication control unit 420, a wired LAN communication control unit 430, an input/output control unit 440, and a service processing unit 450.

The NFC control unit 410 is a processing unit that controls the NFC performed via the NFC unit 209. The NFC control unit 410 also has a function of detecting that the NFC 104 is established or terminated. The wireless LAN communication control unit 420 is a processing unit that controls wireless LAN communication performed via the wireless LAN communication unit 210. Further, the wireless LAN communication control unit 420 has a station (STA) function of operating as a station of the wireless LAN, and an access point (AP) function of operating as an access point of the wireless LAN. When performing the wireless LAN communication 105 directly between the printer 101 and the smartphone 102, the wireless LAN communication control unit 420 establishes a communication path in compliance with the Wireless Fidelity (Wi-Fi) Direct standard (WFD) formulated by the Wi-Fi Alliance, which is an industry organization regarding the wireless LAN. WFD mediates the STA and AP roles and creates the network between the printer 101 and the smartphone 102. The input/output control unit 440 displays a screen on the display unit 201, and recognizes an operation input to the operation unit 202. The service processing unit 450 interprets a print job issued from the smartphone 102 or the cloud server 103, and controls the printing unit 205 to execute print processing.

Figure 5:
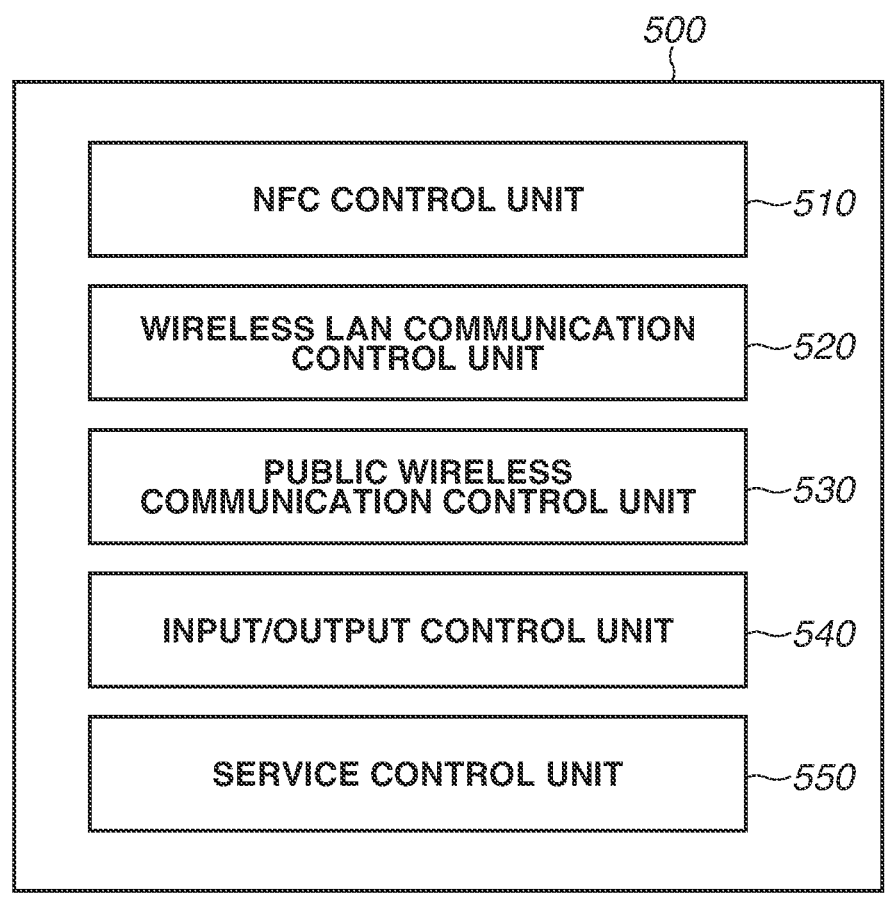
FIG. 5 illustrates an example of a configuration of functional blocks of the smartphone.

FIG. 5 is a functional block diagram (500) of the smartphone 102. The smartphone 102 includes an NFC control unit 510, a wireless LAN communication control unit 520, a public wireless communication control unit 530, an input/output control unit 540, and a service control unit 550.

The NFC control unit 510 is a processing unit that controls the NFC 104 performed via the NFC unit 308. The wireless LAN communication control unit 520 is a processing unit that controls wireless LAN communication performed via the wireless LAN communication unit 309. Further, the wireless LAN communication control unit 520 has the STA function and the AP function of the wireless LAN. The wireless LAN communication control unit 520 establishes a communication path in compliance with WFD.

The wireless LAN communication control unit 420 of the printer 101 and the wireless LAN communication control unit 520 of the smartphone 102 can perform handover processing based on WFD. As described above, the handover refers to the operation of switching the connection from the communication via the first communication path established by a first communication unit to the communication via the second communication path established by a second communication unit. WFD defines determining a communication partner by using the NFC, and performing the wireless LAN communication for forming a communication group with an apparatus determined to be the communication partner.

In WFD, a communication apparatus operating as an access point is called a P2P group owner (hereinafter referred to as a GO), and a communication apparatus operating as a station is called a P2P client (hereinafter referred to as a CL). In other words, in WFD, when the CL apparatus participates in a network created by the GO apparatus, the communication group is formed. The wireless LAN communication control unit 420 determines whether to operate as the GO or the CL according to the GO Negotiation protocol defined in WFD. In WFD, the network constructed by the GO may also be called a P2P group. In the present exemplary embodiment, a network may be referred to as the P2P group. Both the terms indicate the same meaning.

In the present exemplary embodiment, a group of communication apparatuses including the GO, the CL, and a communication apparatus that does not yet determine whether to operate as the GO or the CL will be collectively referred to as a P2P device. The P2P device can become the CL and can also become the GO. The P2P device that does not yet determine whether to operate as the GO or the CL automatically determines whether to operate as the GO or the CL, by conducting the WFD protocol. Then, the P2P device operates as the determined one of the roles, and performs wireless connection and wireless communication. Further, when the apparatuses connect to each other using WFD, the GO provides communication parameters to the CL, and the apparatuses connect to each other using these communication parameters. The communication parameters include various kinds of wireless communication parameters for performing wireless communication in compliance with the IEEE 802.11 standard. More specifically, the communication parameters include wireless communication parameters required for performing wireless LAN communication, such as a Service Set Identifier (SSID) as a network identifier, an encryption method, an encryption key, an authentication method, and an authentication key. Further, the communication parameters may include an IP address for performing communication in the IP layer, and the like.

In this manner, the GO in WFD is an apparatus that operates as an access point, and provides communication parameters. Further, the CL in WFD is an apparatus that operates as a station, and receives the communication parameters.

The public wireless communication control unit 530 is a processing unit that controls the public wireless communication via the public wireless communication unit 310. The input/output control unit 540 displays a screen on the display unit 301, and recognizes an operation input to the operation unit 302. The service control unit 550 issues a print job to the printer 101 or the cloud server 103, thereby controlling the print processing performed by the printer 101.

An operation of the communication system 100 having the above configurations will be described now.

Figure 7A:
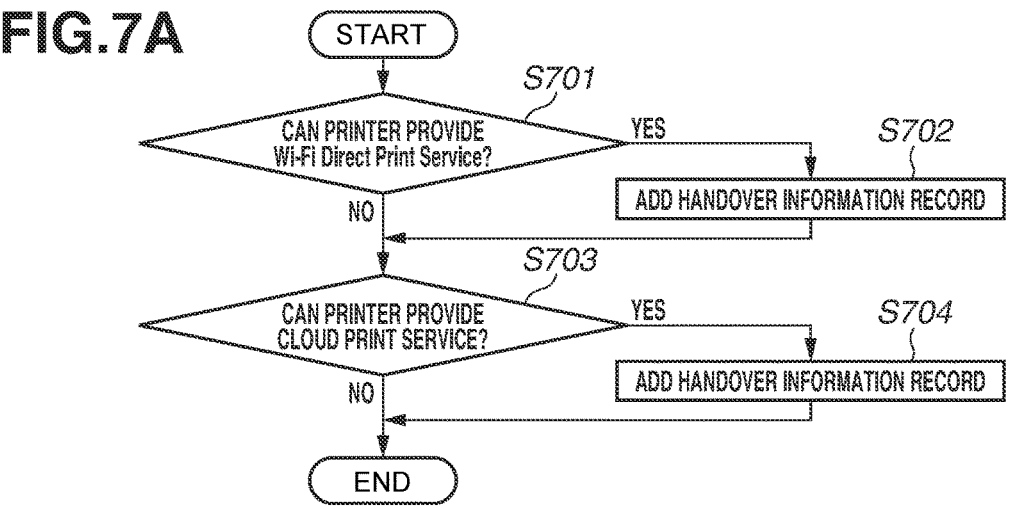
FIGS. 7A, 7B, and 7C are flowcharts each illustrating an operation of the printer.

An operation procedure of the printer 101 according to the first exemplary embodiment will be described with reference to flowcharts of FIGS. 6 to 7C. The flowcharts illustrated in FIGS. 6 to 7C are realized by the control unit 206 executing the control program stored in the ROM 207 to calculate and process the information and control each of the hardware devices. The printer 101 may be configured in such a manner that a part or all of steps indicated in the flowcharts illustrated in FIGS. 6 to 7C are realized by hardware such as an ASIC. The processing illustrated in FIG. 6 is periodically performed when the printer 101 is powered on and each time a predetermined time period elapses.

Assume that, first, the printer 101 is connectable to the cloud server 103 via the wired communication 107, and the smartphone 102 is connectable to the cloud server 103 via the public wireless communication 106, as an initial state.

First, in step S601, the printer 101 creates a Handover Select Message to be transmitted to the smartphone 102 via the NFC 104. The Handover Select Message is a message for switching the connection from the NFC to a different communication method. Further, the Handover Select Message according to the present exemplary embodiment is a message compliant with the NFC Connection Handover specification formulated by the NFC Forum. The NFC Connection Handover specification defines specifications of a message and an operation for handing over the connection from NFC to a different communication medium such as Wi-Fi (the wireless LAN) and Bluetooth®.

This specification defines two types of methods, Static Handover and Negotiated Handover. The Static Handover method is a specification for conducting the handover between the NFC reader/writer and the NFC tag, and the reader/writer reads the Handover Select Message stored in the internal memory of the tag. In the Negotiated Handover method, via bidirectional communication between the reader/writers, one of them transmits a Handover Request Message for requesting the handover, and the other of them transmits the Handover Select Message as a response thereto. In the present exemplary embodiment, the printer 101 and the smartphone 102 are assumed to conduct Static Handover therebetween, but may realize the following processing and function using Negotiated Handover.

FIGS. 8 to 11 each illustrate an example of the Handover Select Message according to the present exemplary embodiment. As illustrated in FIGS. 8 to 11, the Handover Select Message includes one or more handover information records. Then, the handover information record contains one communication medium record, and one or more service information records.

The communication medium record contains information indicating a type of a handover destination communication medium such as Wi-Fi Direct and Bluetooth®. However, the handover destination communication medium does not have to be specified by the communication medium record. If the communication medium is not specified, this means that the handover destination communication medium may be an arbitrary communication medium. Further, the service information record contains information regarding a service executable via the handover destination communication medium. Further, if the handover destination communication medium is specified by the communication medium record, a connection parameter for establishing the communication connection may be added to the Handover Select Message in association with the communication medium record as detailed information. Examples of the connection parameter include various kinds of wireless communication parameters for performing wireless communication in compliance with the IEEE 802.11 standard. More specifically, the connection parameter includes a wireless communication parameter required for performing wireless LAN communication, such as an SSID as a network identifier, a passphrase, an encryption method, an encryption key, an authentication method, an authentication key, and a Media Access Control (MAC) address. Further, the connection parameter may include the IP address for performing communication in the IP layer, and the like. Further, the connection parameter may include a part or all of these parameters.

The service information record contains information indicating a type of a service, such as "Wi-Fi Direct Print Service", and detailed information for accessing the service, such as a Uniform Resource Locator (URL). Wi-Fi Direct Print Service (WFDPS) is the direct print service defined in Wi-Fi Direct Services developed by the Wi-Fi Alliance. WFDPS is a service of establishing wireless connection between the apparatuses by WFD, and directly exchanging print data between the apparatuses using the established communication path.

A specific processing flow of the processing for creating the Handover Select Message in step S601 will be described in detail with reference to FIG. 7A. In the present processing, the printer 101 checks all services that the printer 101 itself can provide, to determine a component element of the Handover Select Message.

First, in step S701, the printer 101 determines whether the printer 101 can provide WFDPS. The service determined in step S701 does not have to be WFDPS, and may be any print service for receiving a print job from the smartphone 102 using the wireless LAN communication unit 210.

For example, the printer 101 determines in step S701 that the printer 101 cannot provide the service, if the printer 101 cannot communicate with the smartphone 102 by WFD because the printer 101 has already connected to the network via the wireless LAN communication unit 210.

If the printer 101 determines in step S701 that the printer 101 can provide the service (YES in step S701), in step S702, the printer 101 adds a handover information record required for executing WFDPS, to the Handover Select Message. More specifically, the control unit 206 of the printer 101 adds the handover information record that contains the communication medium record for handing over the connection to WFD, and the service information record indicating WFDPS.

Figure 8:
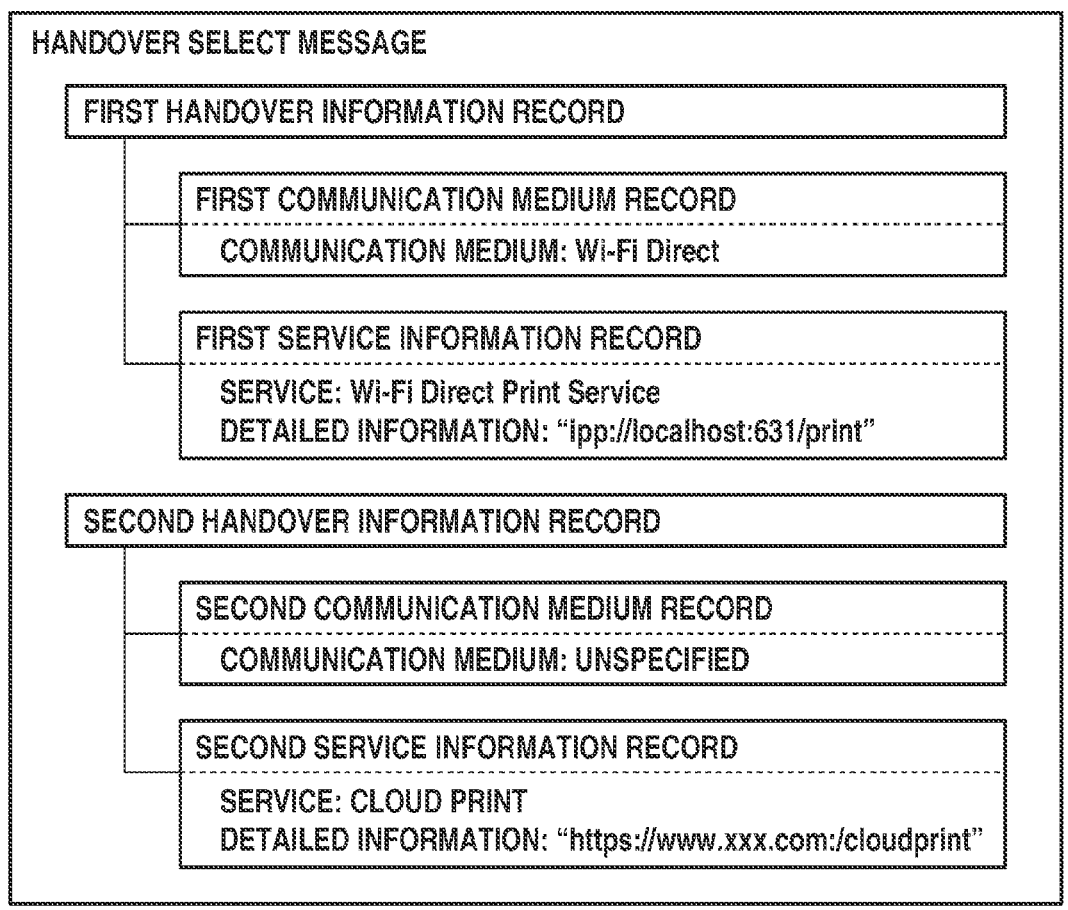
FIG. 8 illustrates an example of a structure of a Handover Message.
Figure 9:
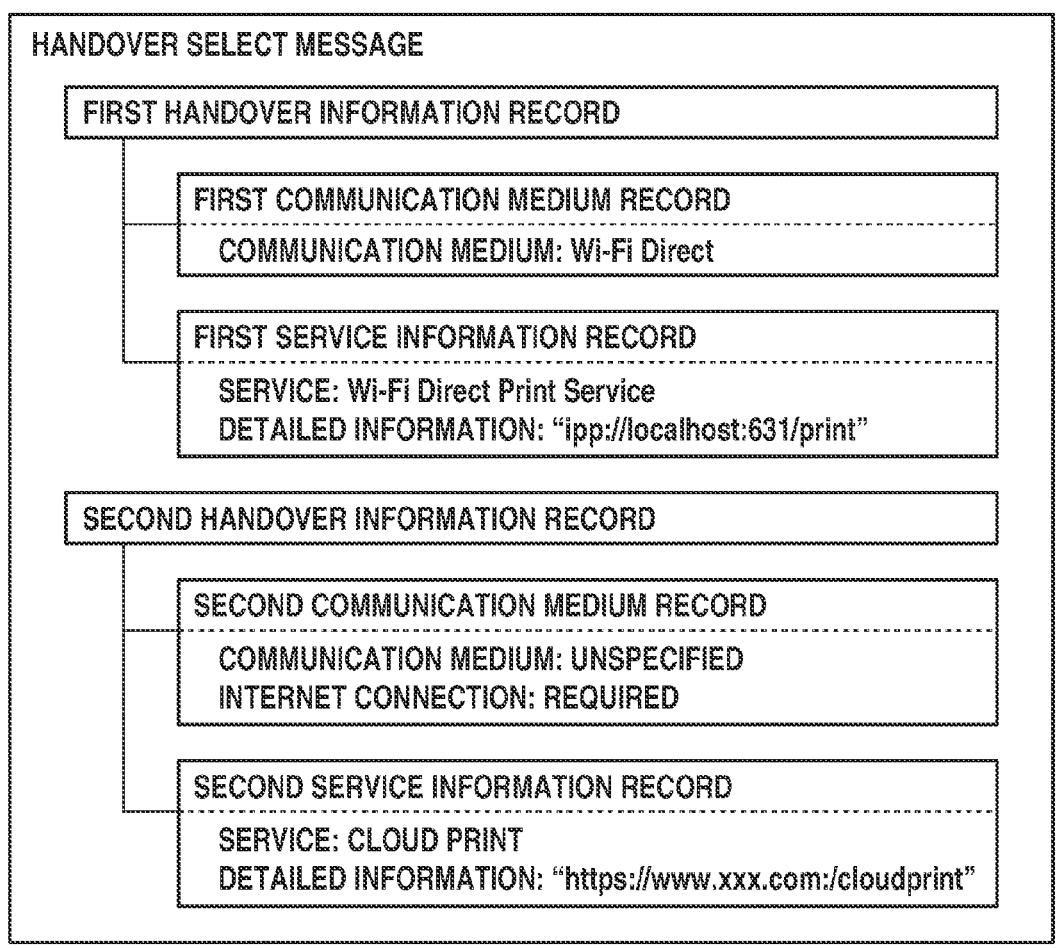
FIG. 9 illustrates an example of a structure of the Handover Message.
Figure 10:
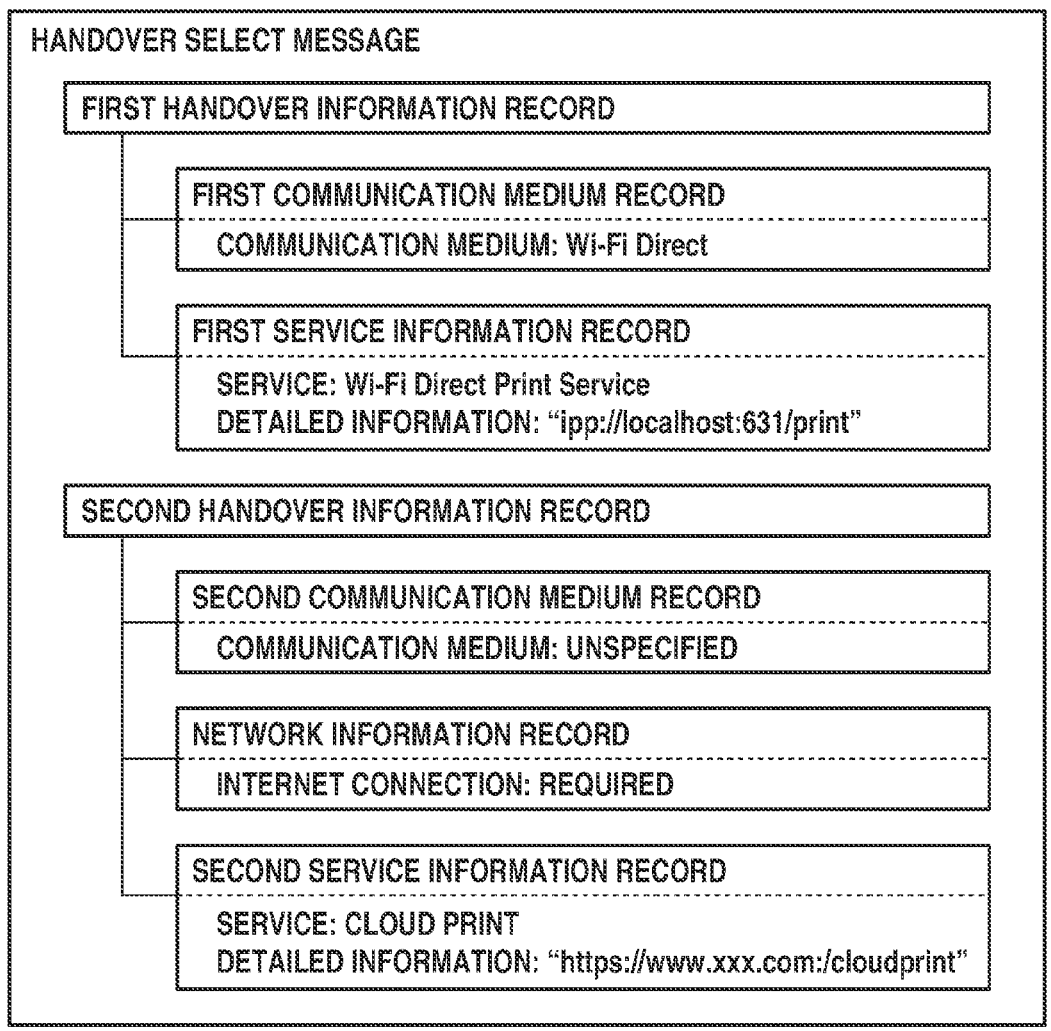
FIG. 10 illustrates an example of a structure of the Handover Message.

An example of the handover information record added in step S702 is a first handover information record illustrated in FIGS. 8 to 10. The communication medium record in the first handover information record contains information indicating "Wi-Fi Direct", which indicates a handover destination communication medium. Further, the service information record in the first handover information record contains "Wi-Fi Direct Print Service", which is information indicating the type of the service. Further, the service information record contains the detailed information indicating the URL for accessing WFDPS.

Next, in step S703, the printer 101 determines whether the printer 101 can provide the cloud print service. The cloud print service is a print service provided via the cloud server 103. For example, the printer 101 determines in step S703 that the printer 101 cannot provide the service, if the printer 101 cannot connect to the cloud server 103 via the wired communication 107.

If the printer 101 determines in step S703 that the printer 101 can provide the service (YES in step S703), in step S704, the printer 101 adds a handover information record indicating that the printer 101 can execute the cloud print service, to the Handover Select Message. The control unit 206 of the printer 101 creates the handover information record indicating that the printer 101 can execute the cloud print service.

FIGS. 8 to 11 each illustrate an example of the handover information record added in step S704. In each of FIGS. 8 to 10, a second handover information record corresponds to the handover information record indicating that the printer 101 can execute the cloud print service. Information indicating that a handover destination communication medium is not specified is input in the communication medium record associated with the service information record indicating that the printer 101 can execute the cloud print service illustrated in each of FIGS. 8 to 11. In other words, the communication medium record indicates that the cloud print service may be executed via an arbitrary communication medium.

As illustrated in FIG. 9, the communication medium record may contain information indicating whether the Internet connection is required. More specifically, the second handover information record illustrated in FIG. 9 indicates that the cloud print service may be executed via an arbitrary communication medium but the Internet connection is required. As illustrated in FIG. 10, the handover information record may separately contain a network information record containing information indicating whether the Internet connection is required.

Further, the service information record in the handover information record indicating that the printer 101 can execute the cloud print service contains "cloud print", which is information indicating the type of the service. Further, the information indicating the type of the service includes the detailed information indicating the URL of the cloud server 103 on the World Wide Web (WWW) for accessing the cloud print service. In other words, the service information record indicating the cloud print service contains address information for communicating with the cloud server 103 on the Internet. The address information for communicating with the cloud server 103 on the Internet may be expressed as the URL, or may be expressed as the global IP address.

Figure 11:
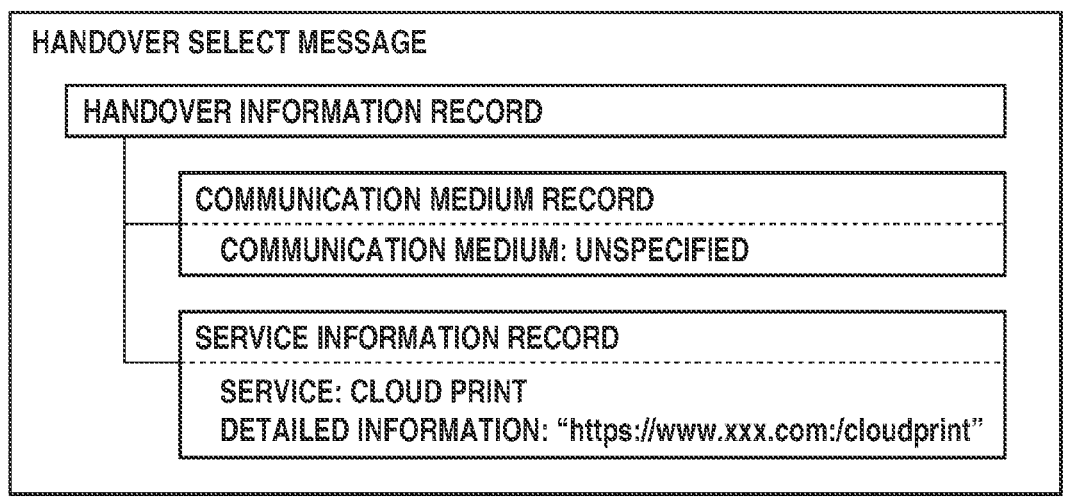
FIG. 11 illustrates an example of a structure of the Handover Message.

As illustrated in FIG. 11, the Handover Select Message may consist of a single handover information record that contains the communication medium record that does not specify a handover destination communication medium, and the service information record indicating the cloud print service, in association with each other.

In the present exemplary embodiment, the printer 101 determines whether the printer 101 can provide the service and adds the record regarding WFDPS and the cloud print service, but may perform similar processing regarding services other than the foregoing.

Returning to the description of FIG. 6, upon completing the processing for creating the Handover Select Message in step S601, in step S602, the control unit 206 writes the created Message into the internal memory of the NFC unit 209, which functions as the NFC tag.

Subsequently, in step S603, the printer 101 determines whether the NFC 104 with the smartphone 102 by the NFC unit 209 is started. The processes in steps S601 and S602 are repeated until the start of the NFC 104 is detected. If the printer 101 detects the start of the NFC 104 in step S603 (YES in step S603), in step S604, the printer 101 transmits the Handover Select Message written in the internal memory of the NFC unit 209, to the smartphone 102 via the NFC 104.

Next, in step S605, the printer 101 performs service standby processing for shifting the printer 101 into a standby state in which the printer 101 is ready for starting the service in response to a request from the smartphone 102, regarding all of the services determined in step S601 to be executable. A specific processing flow of the service standby processing in step S605 will be described in detail with reference to FIG. 7B.

Figure 7B:
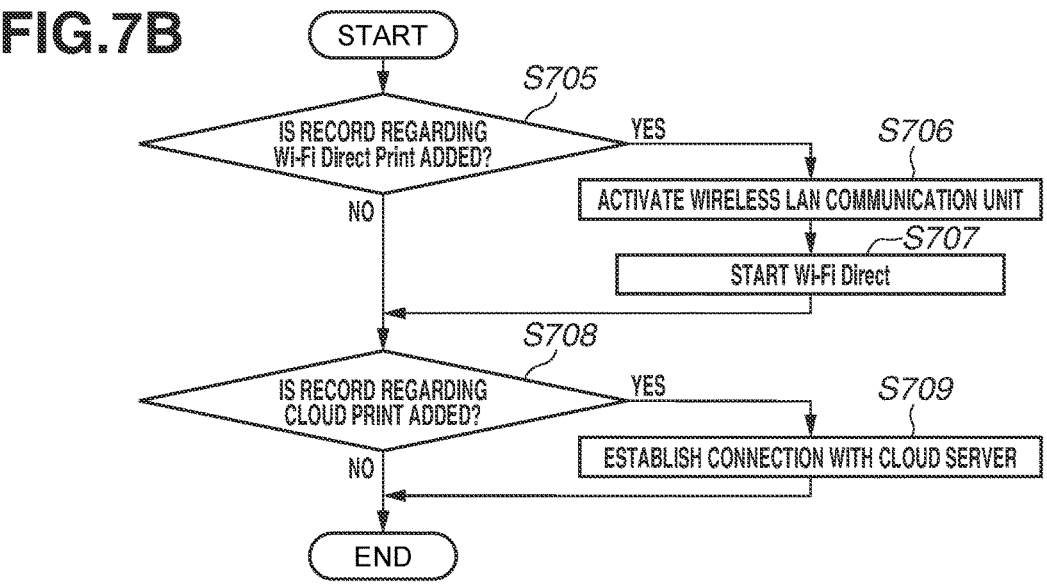
Figure 7C:
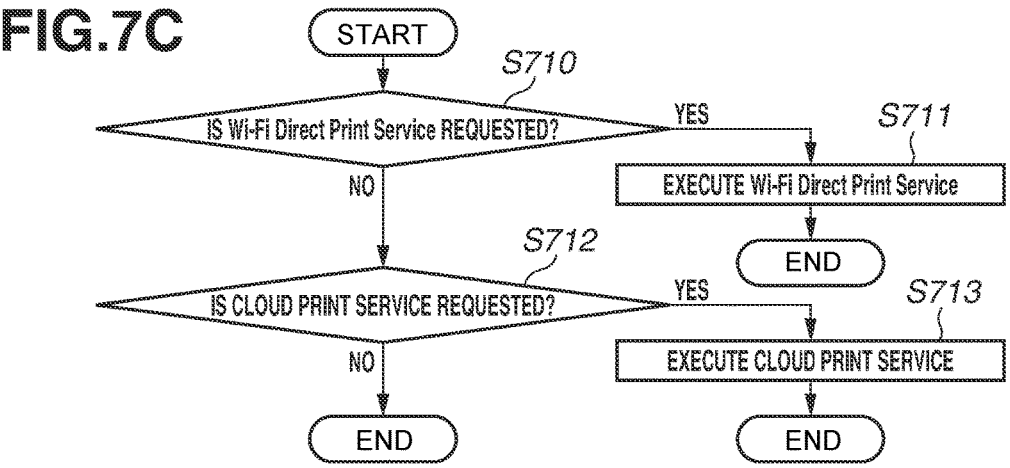

In FIG. 7B, in step S705, the printer 101 determines whether the record regarding WFDPS is added to the Handover Select Message during the processing for creating the Handover Select Message in step S601. The printer 101 may make a similar determination to that in step S701 described above, as the determination in step S705. If the record regarding WFDPS is added (YES in step S705), in step S706, the printer 101 activates an interface of the wireless LAN communication unit 210. Further, in step S707, the printer 101 controls the wireless LAN communication unit 210 to start processing by WFD for establishing the wireless LAN communication 105 with the smartphone 102. The printer 101 enters a state of being able to start connection processing according to a connection request from the smartphone 102.

Next, in step S708, the printer 101 determines whether the record regarding the cloud print service is added to the Handover Select Message during the processing for creating the Handover Select Message in step S601. The printer 101 may make a similar determination to that in step S703 described above, as the determination in step S708.

If the record regarding the cloud print service is added (YES in step S708), in step S709, the printer 101 transmits a request for establishing connection according to TCP, to the cloud server 103 by the wired LAN communication unit 211. Then, the printer 101 establishes the connection with the cloud server 103. The printer 101 may perform another procedure required for starting the cloud print service. For example, the printer 101 may perform processing for inquiring whether a queue of the cloud server 103 includes a print job to be processed by the printer 101. Alternatively, the printer 101 may be configured to connect to the cloud server 103 by Extensible Messaging and Presence Protocol (XMPP), and wait for a print job issuance notification to be transmitted from the cloud server 103. Then, the printer 101 ends the service standby processing.

In a case where the printer 101 supports a service other than WFDPS and the cloud print service, the printer 101 may also perform the service standby processing for the service.

Returning to the description of FIG. 6, in step S606, the printer 101 determines whether a service start request is issued regarding either service of WFDPS and the cloud print service. If the printer 101 receives in step S606 a start request of WFDPS or the cloud print service (YES in step S606), in step S607, the printer 101 performs service processing. The printer 101 may activate a timer when the service standby processing is completed in step S605 or when the NFC 104 is started in step S603, and display an error on the display unit 201 of the printer 101 if the start of the service is not detected by a time when a predetermined time period elapses. Further, the printer 101 may, for example, shift the wireless LAN communication unit 210 into a power saving mode or stop power supply to the wireless LAN communication unit 210 if the start of the service is not detected within a predetermined time period. Further, the printer 101 may be configured to terminate the TCP-based connection with the cloud server 103 via the wired LAN communication unit 211 if the start of the service is not detected within a predetermined time period. Further, the printer 101 may be configured to terminate the XMPP-based connection with the cloud server 103, or may be configured to maintain the XMPP-based connection with the cloud server 103.

Subsequently, the service processing in step S607 will be described in detail with reference to the flowchart of FIG. 7C. First, in step S710, the printer 101 determines whether the service start request is a start request of WFDPS. If a WFD connection request is received from the smartphone 102 by the wireless LAN communication unit 210, the printer 101 determines that the service start request is a start request of WFDPS (YES in step S710).

If determining that the service start request is a start request of WFDPS (YES in step S710), in step S711, the printer 101 executes WFDPS. In step S711, the printer 101 performs connection processing for establishing the wireless LAN communication 105 with the smartphone 102 by WFD. Then, the printer 101 receives a print job containing print data from the smartphone 102 based on a predetermined print protocol, such as Internet Printing Protocol (IPP), using the established wireless LAN communication 105. The printer 101 prints the print data by the printing unit 205 based on the received print job. Upon completion of the WFDPS processing, the service processing is ended. At this time, the printer 101 may terminate the wireless LAN communication 105, or may maintain the wireless LAN communication 105 for receiving another print request.

The printer 101 may terminate the TCP connection with the cloud server 103 that has been established in step S709, when the request for the WFD connection is received from the smartphone 102 (YES in step S710).

On the other hand, if the request for the WFD connection is not received (NO in step S710), in step S712, the printer 101 determines whether the service start request is a start request of the cloud print service. If a print job issuance notification is received from the smartphone 102 via the cloud server 103, the printer 101 determines that the service start request is a start request of the cloud print service (YES in step S712). If the print job issuance notification is received from the cloud server 103 by the wired LAN communication unit 211 (YES in step S712), in step S713, the printer 101 performs the cloud print service processing.

The print job issuance notification is a message for notifying the printer 101 that a print job issued from the smartphone 102 is accumulated into the queue of the cloud server 103, and contains a job identifier of the print job. Based on the job identifier, the printer 101 requests the cloud server 103 to transmit the print job containing the print data by the wired LAN communication unit 211. Then, the printer 101 prints the print data by the printing unit 205 based on the print job acquired by the wired LAN communication unit 211. Further, the printer 101 can notify, via the cloud server 103, the smartphone 102 of a status such as a start/end/error of the print processing when necessary. Further, the smartphone 102 is automatically notified of this notification, and the smartphone 102 displays this notification on the display unit 301.

The printer 101 may deactivate the interface of the wireless LAN communication unit 210, which has been activated in step S706, when the print job issuance notification is received from the smartphone 102 via the cloud server 103 (YES in step S712). Further, the printer 101 may stop the WFD processing. Upon completing the service processing in step S607, the printer 101 ends the processing.

Figure 12:
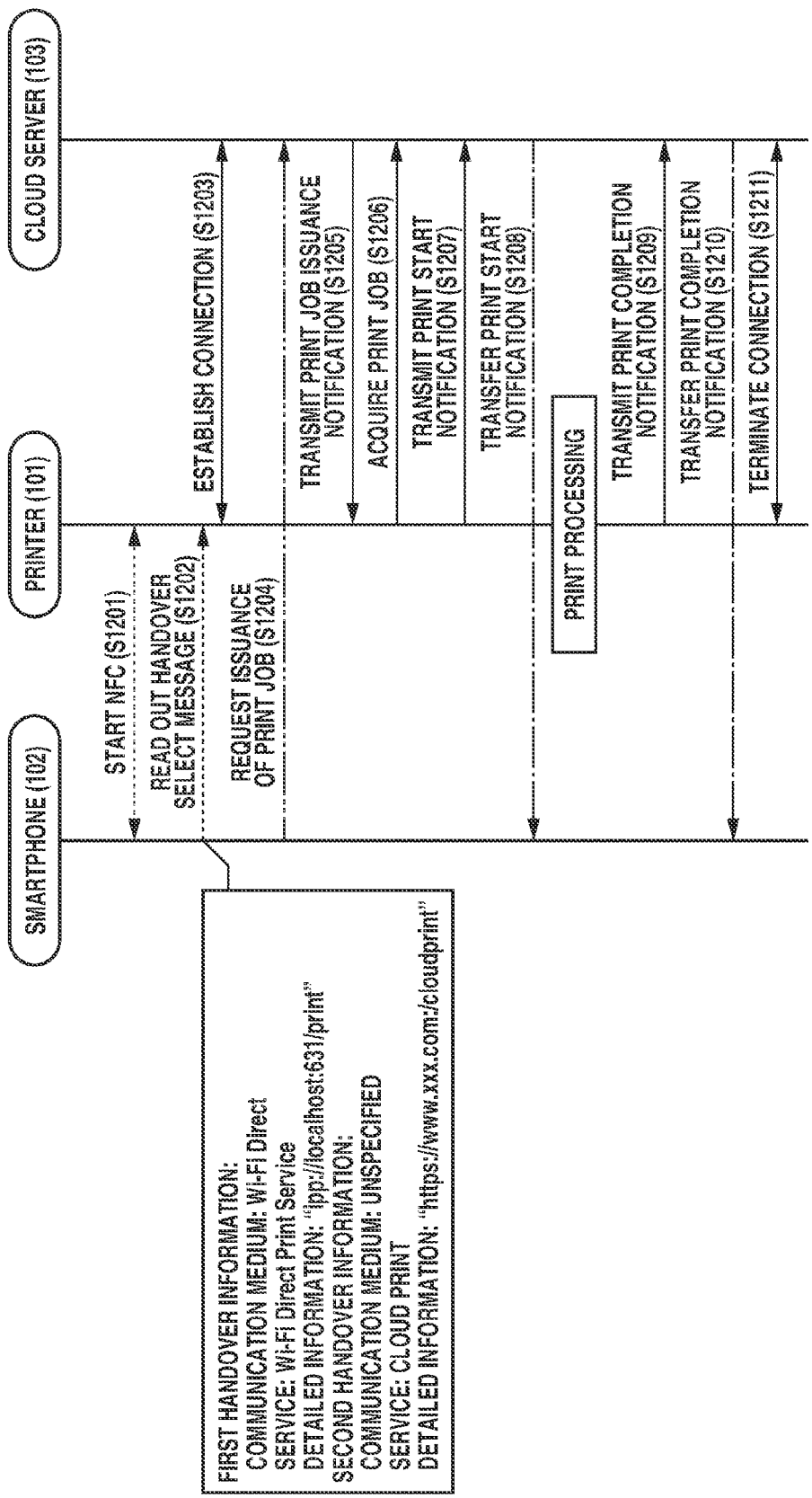
FIG. 12 illustrates a communication sequence of the system.

Next, an example of a communication sequence between the printer 101 and the smartphone 102 will be described in detail with reference to FIG. 12. In FIG. 12, the printer 101 is assumed to have already stored the Handover Select Message containing the various kinds of records regarding the services into the internal memory of the NFC unit 209 as an initial state thereof. More specifically, the printer 101 is assumed to have already stored the Handover Select Message containing the various kinds of records regarding WFDPS and the cloud print service into the internal memory of the NFC unit 209. Further, the smartphone 102 is assumed to be in such a state that the user has selected an image to be printed, by operating the operation unit 302 of the smartphone 102. The data to be printed may be a text or the like.

If the user brings the smartphone 102 close to the printer 101, in step S1201, the NFC 104 is started between the printer 101 and the smartphone 102. In step S1202, the smartphone 102 reads out the Handover Select Message stored in the internal memory of the NFC unit 209 of the printer 101. Triggered by the start of the NFC 104 (S1201), in step S1203, the printer 101 activates WFD and establishes the TCP connection with the cloud server 103. Next, the smartphone 102 analyzes the read Handover Select Message, and selects any one service of WFDPS and the cloud print service.

In the present exemplary embodiment, the smartphone 102 is assumed to automatically select the cloud print service if the cloud print service is available in a case where the smartphone 102 can execute a plurality of print services together with the printer 101.

Alternatively, the smartphone 102 may select a service to be executed, according to the Internet communication being performed via the public wireless communication 106 of the smartphone 102. For example, in a case where the smartphone 102 cannot perform communication by the wireless LAN communication unit 309 and communication by the public wireless communication unit 310 in parallel with each other, the handover to WFD makes the smartphone 102 unable to maintain the Internet communication by the public wireless communication unit 310. Therefore, the handover to WFD during the Internet communication may cause inconvenience for an application using the Internet communication. Therefore, if the application is in the middle of the Internet communication, the smartphone 102 determines not to use WFDPS but to use the cloud print service. Alternatively, the smartphone 102 may select a service to be executed, according to the information regarding whether the Internet connection is required that is associated with the record corresponding to the service specified in the Handover Select Message.

Alternatively, the smartphone 102 may select a service according to a storage location of the data to be printed. For example, the smartphone 102 selects WFDPS if the print target data is stored in the smartphone 102 itself, such as the storage unit 303, and selects the cloud print service if the print target data is stored in the cloud server 103.

The smartphone 102 may automatically select WFDPS if WFDPS is available in a case where the smartphone 102 can execute a plurality of print services together with the printer 101. However, the smartphone 102 may select a service to be executed, according to an instruction received from the user via the operation unit 302.

In the following description, the communication sequence illustrated in FIG. 12 will be continuously described, focusing on the example in which the smartphone 102 selects the cloud print service. In step S1204, the smartphone 102 accesses the URL contained in the service information record regarding the cloud print service, and requests the cloud server 103 to issue the print job for printing the print target data, using the public wireless communication unit 310. The smartphone 102 may transmit print target data itself to the cloud server 103 using the public wireless communication unit 310 at this point of time. Alternatively, in a case where print target data is already stored in the cloud server 103, the smartphone 102 may transmit identification information for identifying the print target data, to the cloud server 103 using the public wireless communication unit 310.

Upon receiving the request for the issuance of the print job from the smartphone 102, in step S1205, the cloud server 103 transmits a print job issuance notification to the printer 101 using the TCP connection established in step S1203. In step S1206, the printer 101 acquires the print job queued in the cloud server 103, by the wired LAN communication unit 211 based on the job identifier contained in the print job issuance notification. Further, in step S1207, the printer 101 analyzes the print job, and transmits a print start notification to the cloud server 103 if determining that the printer 101 can start the print processing. In step S1208, the cloud server 103 transfers the print start notification received from the printer 101, to the smartphone 102. The smartphone 102 notifies the user that the printing is started by displaying that on the display unit 301.

Upon completing the print processing, in step S1209, the printer 101 transmits a print completion notification to the cloud server 103. Further, in step S1210, the cloud server 103 transfers the print completion notification to the smartphone 102. The smartphone 102 displays the completion of the printing on the display unit 301 upon receiving the print completion notification. The printer 101 terminates the TCP connection with the cloud server 103 upon completing the printing.

As described above, according to the present exemplary embodiment, the service information can be shared between the apparatuses before the apparatuses are connected to each other by the communication method different from the near field wireless communication, which can reduce unnecessary handover processing. Further, according to the present exemplary embodiment, the print service executable in common between the apparatuses can be quickly executed only by the performing the simple operation of bringing the apparatuses close to each other. Further, according to the present exemplary embodiment, the cloud print service can be executed triggered by the connection via the near field wireless communication.

Further, the smartphone 102 can select a service suitable for the current status from among a plurality of services. Further, since the printer 101 establishes the connection with the cloud server 103 according to the establishment of the near field wireless communication, the connection can be established by the simple operation. Further, the printer 101 can terminate the connection with the cloud server 103 when the printer 101 does not have to print the print data. This can reduce power consumption.

Further, the printer 101 stops the wireless LAN communication unit 210 when the cloud print service is started between the printer 101 and the smartphone 102. This can reduce unnecessary power consumption. Further, the printer 101 terminates the connection with the cloud server 103 when the direct print service via the direct communication is started between the printer 101 and the smartphone 102. This can reduce unnecessary power consumption.

In the first exemplary embodiment, the description has been given of an example of the method for printing the print data using Static Handover in which the respective NFC control units 410 and 510 of the printer 101 and the smartphone 102 operate as the NFC tag and the reader/writer, respectively. Hereinafter, the description will be given of an example of a method using Negotiated Handover in which the printer 101 and the smartphone 102 exchange Handover Messages via the bidirectional communication. The configurations of the apparatuses according to the present exemplary embodiment are similar to those in the first exemplary embodiment, except that the NFC unit 209 operates as the reader/writer.

Figure 13:
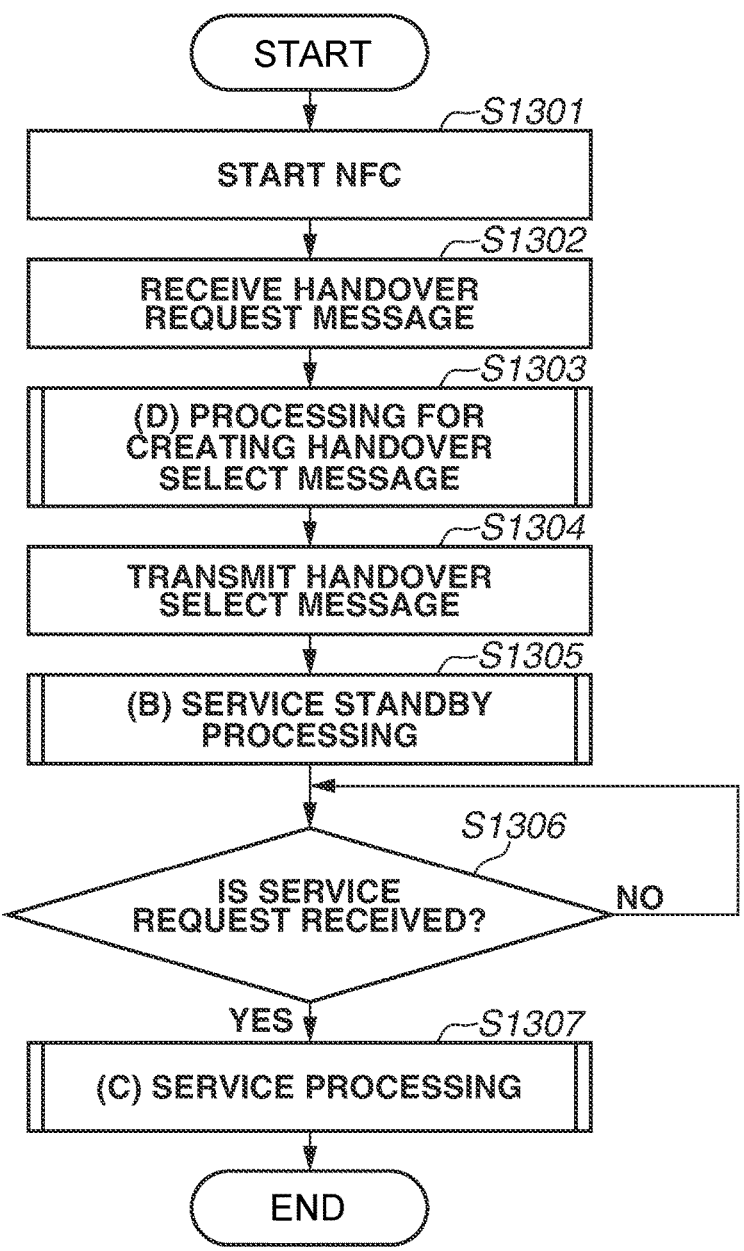
FIG. 13 is a flowchart illustrating an operation of a printer.
Figure 14:
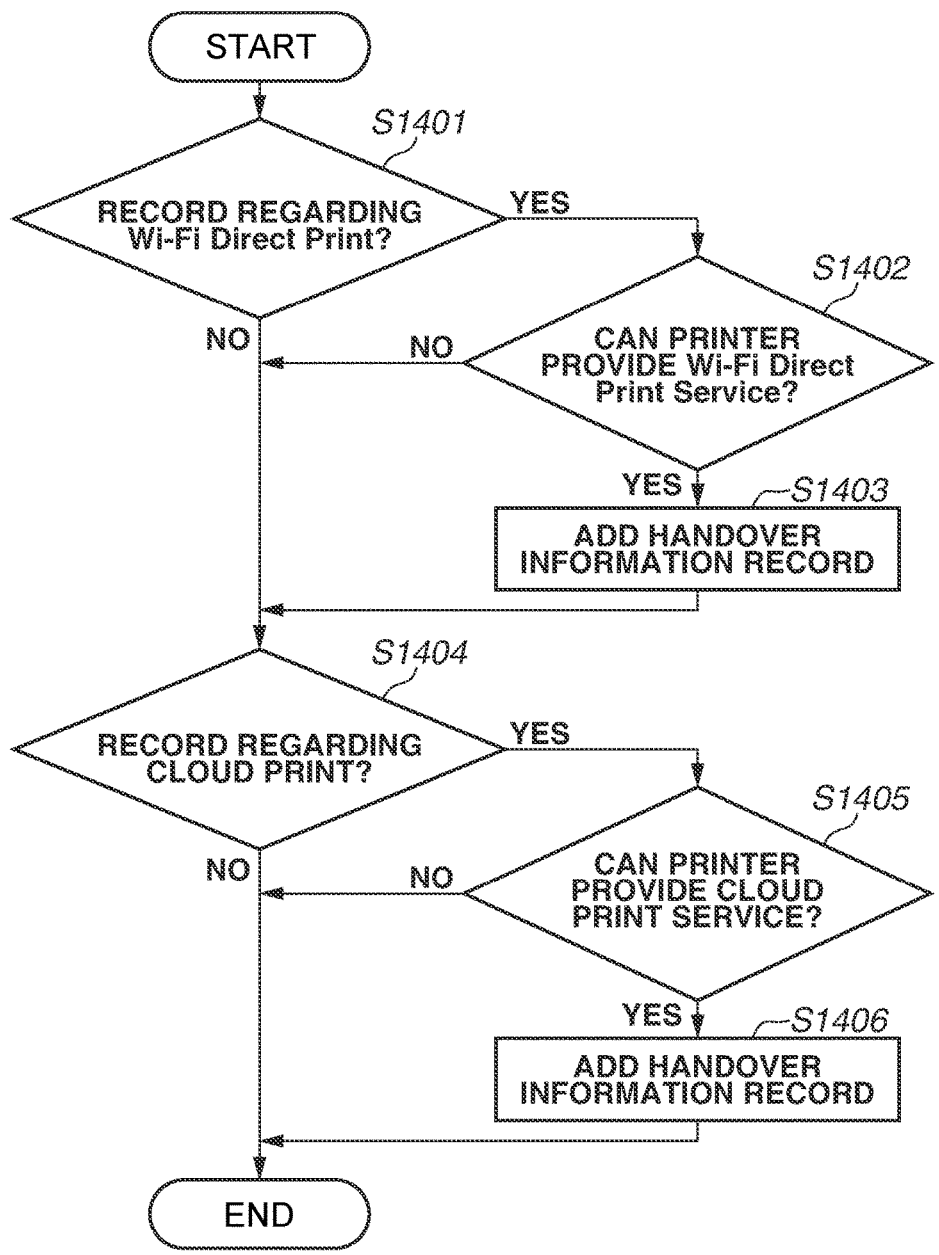
FIG. 14 is a flowchart illustrating an operation of the printer.

Flowcharts of FIGS. 13 and 14 illustrate a procedure of an operation performed by the printer 101 when the printer 101 and the smartphone 102 are brought close to each other. The flowcharts illustrated in FIGS. 13 and 14 are realized by the control unit 206 executing a control program stored in the ROM 207 to calculate and process information and control each of the hardware devices. The printer 101 may be configured in such a manner that a part or all of steps indicated in the flowcharts illustrated in FIGS. 13 and 14 are realized by hardware, such as an ASIC. In the following description, similar contents to the first exemplary embodiment will not be described.

Assume that, first, the printer 101 is connectable to the cloud server 103 via the wired communication 107, and the smartphone 102 is connectable to the cloud server 103 via the public wireless communication 106, as an initial state.

First, in step S1301, the printer 101 starts the NFC 104 with the smartphone 102. Then, in step S1302, the printer 101 receives a Handover Request Message from the smartphone 102 via the NFC 104. The Handover Request Message is a message compliant with the NFC Connection Handover specification. The Handover Request Message is assumed to be structured in a format similar to the Handover Select Message illustrated in each of FIGS. 8 to 11.

Next, in step S1303, the printer 101 performs processing for creating a Handover Select Message that contains various kinds of records regarding a service that the printer 101 can provide, based on the received Handover Request Message. A specific processing flow of the processing for creating the Handover Select Message in step S1303 will be described in detail with reference to processing (D) illustrated in FIG. 14.

In the processing for creating the Handover Select Message, the printer 101 determines whether the received Handover Request Message contains various kinds of records regarding the service that the printer 101 supports. Then, the printer 101 performs processing for adding the various kinds of records regarding the service to the Handover Select Message.

First, in step S1401, the printer 101 determines whether the received Handover Request Message contains various kinds of records regarding WFDPS. If the Handover Request Message contains the records regarding WFDPS (YES in step S1401), in step S1402, the printer 101 determines whether the printer 101 can provide WFDPS. If the printer 101 can provide WFDPS (YES in step S1402), in step S1403, the printer 101 adds the various kinds of records required for executing WFDPS, to the Handover Select Message.

Subsequently, in step S1404, the printer 101 determines whether the received Handover Request Message contains various kinds of records regarding the cloud print service. If the Handover Request Message contains the records regarding the cloud print service (YES in step S1404), in step S1405, the printer 101 determines whether the printer 101 can provide the cloud print service.

If the printer 101 can provide the cloud print service (YES in step S1405), in step S1406, the printer 101 adds the various kinds of records required for executing the cloud print service, to the Handover Select Message. The printer 101 may be configured to select any one service in a case where the printer 101 can execute a plurality of print services together with the smartphone 102, and create the Handover Select Message that contains only the various kinds of records regarding the selected service. For example, the printer 101 may be configured to preferentially select WFDPS in a case where the printer 101 can execute the cloud print service and WFDPS together with the smartphone 102. However, the printer 101 may select a service to be executed, according to an instruction received from the user via the operation unit 202.

The printer 101 has been described as being able to execute only WFDPS and the cloud print service, but may be configured to make a similar determination also for a service other than the foregoing.

Returning to the description of FIG. 13, upon completing the processing for creating the Handover Select Message in step S1303, in step S1304, the printer 101 transmits the created Handover Select Message to the smartphone 102 using the NFC 104. Processes from steps S1305 to S1307 after that are similar to the processes from steps S605 to S607 in the first exemplary embodiment, respectively, and therefore descriptions thereof will be omitted here.

Next, an example of a communication sequence between the printer 101 and the smartphone 102 will be described in detail with reference to FIG. 15. First, the smartphone 102 is assumed to be in such a state that the user has selected an image to be printed, by operating the operation unit 302 of the smartphone 102, as an initial state. The print target data may be a text or the like.

If the user brings the smartphone 102 close to the printer 101, in step S1501, the NFC 104 is started between the printer 101 and the smartphone 102. In step S1502, the smartphone 102 transmits the Handover Request Message that contains various kinds of records regarding a service that the smartphone 102 can execute, to the printer 101 using the NFC 104. In this example, suppose that the Handover Request Message transmitted from the smartphone 102 contains the communication medium records and the service information records regarding WFDPS and the cloud print service.

The printer 101 determines the service that the printer 101 can execute, among the services contained in the Handover Request Message received from the smartphone 102. Then, in step S1503, the printer 101 transmits the Handover Select Message that contains the various kinds of records regarding the service executable in common between the printer 101 and the smartphone 102, to the smartphone 102 using the NFC 104. In this example, the printer 101 is assumed to preferentially select WFDPS, and create the Handover Select Message that contains the various kinds of records required for executing WFDPS. Further, the service information record contained in the Handover Select Message transmitted from the printer 101 contains the detailed information such as the URL required for the smartphone 102 using the service.

Next, in step S1504, the WFD communication is started between the printer 101 and the smartphone 102. Then, in step S1505, the smartphone 102 transmits a print job to the printer 101 via the wireless LAN communication 105. In step S1506, the printer 101 transmits a print start notification to the smartphone 102 according to the start of the printing. Then, upon completing the printing, in step S1507, the printer 101 transmits a print completion notification. Then, in step S1508, the WFD communication is ended.

As described above, according to the present exemplary embodiment, the service information can be exchanged between the apparatuses. Further, according to the present exemplary embodiment, the service to be executed is limited to one service, and the printer 101 can wait for the service. This limitation eliminates the necessity of waiting for a service request from the smartphone 102 with a plurality of communication interfaces as in the first exemplar embodiment. This can reduce the power consumption.

The above-described exemplary embodiments are merely examples, and aspects of the present invention are not limited to the above-described exemplary embodiments, and can be embodied with being modified without changing the essence thereof.

In the above-described exemplary embodiments, the description has been given of a case in which the wireless communication method to which the connection is handed over from the NFC is limited to the wireless LAN, but the present invention is not limited thereto. For example, the connection may be handed over to communication by Bluetooth®.

Further, in the above-described exemplary embodiments, the description has been given of an example of the method for performing the wireless LAN communication by performing the connection procedure according WFD. However, aspects of the present invention are not limited thereto. The communication apparatuses may perform the wireless LAN communication therebetween with one of them serving as the AP, or may be configured to perform the communication therebetween via an external access point. Alternatively, the communication apparatuses may be configured to perform the communication therebetween in an ad hoc mode.

Further, the above-described exemplary embodiments have been described assuming that the system includes the printer 101 and the smartphone 102, but the above-described processing may be performed using another apparatus. Further, the service transmitted and received between the communication apparatuses is not limited to the printing of an image and a text. For example, the communication apparatuses may be configured to transmit and receive therebetween the various kinds of records regarding a service such as an image transfer, image reproduction, and an image/text scan. Further, the communication apparatuses may collectively transmit and receive therebetween a plurality of services among these services.

Further, the above-described exemplary embodiments have been described assuming the use of the Handover Request Message and the Handover Select Message defined by the NFC Forum, but aspects of the present invention are not limited thereto.

Further, the above-described exemplary embodiments have been described based on the example of handing over the connection from NFC to another communication method, but may be configured to hand over the connection, for example, from Bluetooth® to another communication method.

Further, in the above-described exemplary embodiments, the description has been given of a case in which the service information regarding the cloud print service that is transmitted from the printer 101 contains the URL for the smartphone 102 issuing the print job. However, the printer 101 may be configured to transmit information for performing other kinds of processing with such information contained in the service information regarding the cloud print service.

For example, the printer 101 may have to be registered with the cloud server 103 to use the cloud print service. The printer 101 may be configured to transmit a URL for performing this registration processing as the service information regarding the cloud print service by NFC in step S604 or S1304. The printer 101 transmits a registration request to the cloud server 103, and the cloud server 103 issues this URL for performing the registration processing as a response thereto. Upon receiving the URL for performing the registration processing from the cloud server 103 by the wired LAN communication unit 211, the printer 101 writes this URL into the internal memory of the NFC unit 209 as the detailed information of the service information record.

If receiving the URL for performing the registration processing from the printer 101 by NFC, the smartphone 102 accesses this URL, and communicates account information with the cloud server 103. If the account information from the smartphone 102 is valid information, the cloud server 103 registers this account information and the printer 101 in association with each other.

The cloud server 103 transmits a registration completion notification to the printer 101, upon completing the registration of the printer 101. Upon receiving the registration completion notification, the printer 101 connects to the cloud server 103 by XMPP, and waits for the print job issuance notification from the cloud server 103.

When using the cloud print service after the completion of the registration processing, the smartphone 102 can perform print processing by selectively using the printer 101 associated with the account information based on which the smartphone 102 has signed in.

Upon receiving, from the smartphone 102, a print job that requests the cloud print service selectively using the printer 101, the cloud server 103 transmits the print job issuance notification to the printer 101 in a similar manner to the above-described operation.

Upon receiving the print job issuance notification, the printer 101 acquires the print job from the cloud server 103, and then prints the print data.

In this manner, the smartphone 102 can be notified, by NFC, of the URL for registering the printer 101 with the cloud server 103 by the NFC. This allows the cloud print service to be used with a further simple operation.

The printer 101 may be configured to transmit identification information for activating an application for executing the cloud print service, as the service information regarding the cloud print service, in a case where the printer 101 is already registered with the cloud server 103. Alternatively, the printer 101 may be configured to transmit by NFC address information for signing in to an account, as the service information regarding the cloud print service, in a case where the printer 101 is already registered with the cloud server 103.

Aspects of the present invention can also be realized by processing including supplying a program for realizing one or more functions of the above-described exemplary embodiments to a system or an apparatus via a network or a storage medium, and causing one or more processors in a computer of this system or apparatus to read out and execute the program. Further, aspects of the present invention can also be realized by a circuit (for example, an ASIC) for realizing one or more functions.

According to an exemplary embodiment of aspects of the present invention, a service based on communication with an external apparatus can be executed triggered by the establishment of near field wireless communication with another communication apparatus.

Embodiment(s) of aspects of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-002521, filed Jan. 8, 2015, which is hereby incorporated by reference herein in its entirety.

What is claimed is:

1. A communication apparatus comprising:
one or more processors; and
one or more memories storing instructions that, when executed by the one or more processors, cause the communication apparatus to perform a process comprising:
performing, at a first communicator, near field wireless communication by a first communication method;
transmitting, at a transmitter, a message including information of a first service to be executed by performing communication with an external apparatus and information of a second service to be executed by performing wireless communication directly with another communication apparatus by a second communication method different from the first communication method, to the another communication apparatus by the first communicator;
in response to transmission of the message, establishing a connection with the external apparatus, and starting processing for performing wireless communication directly with the another communication apparatus by the second communication method; and
in a case where the second service is executed, disconnecting the connection with the external apparatus.

2. The communication apparatus according to claim 1, wherein the information of the first service is a Uniform Resource Locator (URL) or an IP address of the external apparatus.

3. The communication apparatus according to claim 1, wherein the information of the first service contains information indicating that an Internet connection is required.

4. The communication apparatus according to claim 1, wherein the process performed by the communication apparatus further comprises:

performing, at a second communicator, communication by the second communication method having a communication speed higher than that of the first communication method.

5. The communication apparatus according to claim 1, wherein the second communication method is compliant with IEEE 802.11 series.

6. The communication apparatus according to claim 4, wherein, in a case where the first service is executed, power supply to the second communication unit is stopped.

7. The communication apparatus according to claim 1, wherein the first service and the second service are a print service.

8. The communication apparatus according to claim 1, wherein the first service is a print service for using computer processing performed by the external apparatus.

9. The communication apparatus according to claim 1, wherein the first communication method is Near Field Communication (NFC), TransferJet, or Bluetooth.

10. The communication apparatus according to claim 1, further comprising a third communicator configured to perform wired communication,
wherein the first service is executed by using the third communicator.

11. The communication apparatus according to claim 1, wherein, in a case where the first service is not started by a time when a predetermined time period elapses since the communication apparatus is connected to the another communication apparatus by the first communicator, an error notification is issued.

12. The communication apparatus according to claim 1, wherein the process performed by the communication apparatus further comprises determining whether the first service is executable, and
wherein, in a case where it is determined that the first service is executable when the communication apparatus is connected to the another communication apparatus by the first communicator, the transmitter transmits the service information indicating the first service.

13. The communication apparatus according to claim 12, wherein the process performed by the communication apparatus further comprises writing the service information indicating the first service into a memory of the communication apparatus in a case where it is determined that the first service is executable, and
wherein the transmitter transmits the service information stored in the memory.

14. The communication apparatus according to claim 1, wherein the first service is a service executed by communicating with the external apparatus using a global IP address.

15. A method for controlling a communication apparatus including a first communicator configured to perform near field wireless communication, which is a first communication method, the method comprising:
transmitting a message including information of a first service to be executed by performing communication with an external apparatus and information of a second service to be executed by performing wireless communication directly with another communication apparatus by a second communication method different from the first communication method, to the another communication apparatus by the first communicator;
in response to transmission of the message, establishing a connection with the external apparatus, and starting processing for performing wireless communication directly with the another communication apparatus by the second communication method; and in a case where the second service is executed, disconnecting the connection with the external apparatus.

16. A non-transitory storage medium storing computer executable instructions which, when executed, cause a computer to execute a method for controlling a communication apparatus including a first communicator configured to perform near field wireless communication, which is a first communication method, the method comprising:

transmitting a message including information of a first service to be executed by performing communication with an external apparatus and information of a second service to be executed by performing wireless communication directly with another communication apparatus by a second communication method different from the first communication method, to the another communication apparatus by the first communicator;

in response to transmission of the message, establishing a connection with the external apparatus, and starting processing for performing wireless communication directly with the another communication apparatus by the second communication method; and in a case where the second service is executed, disconnecting the connection with the external apparatus.

* * * * *